United States Patent [19]

Pokornicki

[11] 3,807,765

[45] Apr. 30, 1974

[54] TRACTOR-TRAILER COUPLING

[75] Inventor: Thaddeus B. Pokornicki, Utica, Mich.

[73] Assignee: The United States of America as represented by the Secretary of the Army, Washington, D.C.

[22] Filed: Oct. 2, 1972

[21] Appl. No.: 293,873

[52] U.S. Cl............................ 280/433, 280/415 A
[51] Int. Cl............................................. B62d 53/08
[58] Field of Search................. 280/433, 407, 415 A

[56] References Cited
UNITED STATES PATENTS

| | | | |
|---|---|---|---|
| 2,838,324 | 6/1958 | Dalton | 280/407 |
| 3,600,005 | 8/1971 | Glaza | 280/433 |

Primary Examiner—Leo Friaglia
Attorney, Agent, or Firm—Edward J. Kelly; Herbert Berl; John F. Schmidt

[57] ABSTRACT

A reversible king pin, symmetrical about a point midway between its ends, is held in a mounting by a split, externally-threaded wedge adapter engaging one groove of the king pin. Projecting elements are wedged between the upper end of the pin and a conical surface of the internally-threaded base which is welded into the trailer floor structure. A threaded lock ring carries another set of projecting elements and is screwed into engagement with a conical surface in the wedge adapter and also with the king pin. A snap ring engages a groove in the base and the lower face of the lock ring to hold the assembly together.

18 Claims, 5 Drawing Figures

PATENTED APR 30 1974 3,807,765

TRACTOR-TRAILER COUPLING

BACKGROUND OF THE INVENTION

1. Field of the Invention

The invention relates to a tractor-trailer coupling, and more specifically to the trailer-mounted portion of the coupling, which cooperates with the tractor-mounted fifth wheel. Conventionally, the fifth wheel is slotted to receive a king pin which projects downward from the underside or floor of the trailer near its forward end.

2. Description of the Prior Art

In conventional trailer couplings, the king pin wears to the point that it can no longer be relied on to keep the trailer coupled to the tractor. Since the king pin is, moreover, conventionally formed integral with the trailer floor and possibly also the fifth wheel plate of the trailer, king pin replacement becomes a maintenance problem involving cutting out the worn out pin and welding in a new one.

SUMMARY OF THE INVENTION

The invention is a mounting means for an easily replaceable king pin, and in its preferred form is adapted to hold a reversible king pin — i.e., a king pin which has identical ends so that, when the initially exposed end becomes too worn to be reliable, the pin can be removed and turned end-for-end, being reinserted with the worn end in the mounting means so as to expose for coupling function the end which was initially held inside the mounting means. The mounting means includes a base welded into the trailer floor, the base having a vertically disposed opening which is threaded throughout the major portion of its length but which, at its upper end, is provided with a conical surface. The opening is larger than the pin and defines an annular space with the pin. Wedge means in the annular space frictionally engages the pin and the base to hold them against relative movement.

The wedge means comprises a two-piece adapter and a lock ring both of which have threaded engagement with the base in said opening. The adapter is in two pieces (a split ring) so that it can engage a groove in the king pin. The adapter has an internal conical surface which engages the lock ring so as to force the wedge means into frictional engagement with the king pin. The base opening is grooved at its lower end to receive a snap ring to hold the wedge means in place in the opening.

DESCRIPTION OF ILLUSTRATED PREFERRED EMBODIMENT

Figure 1:
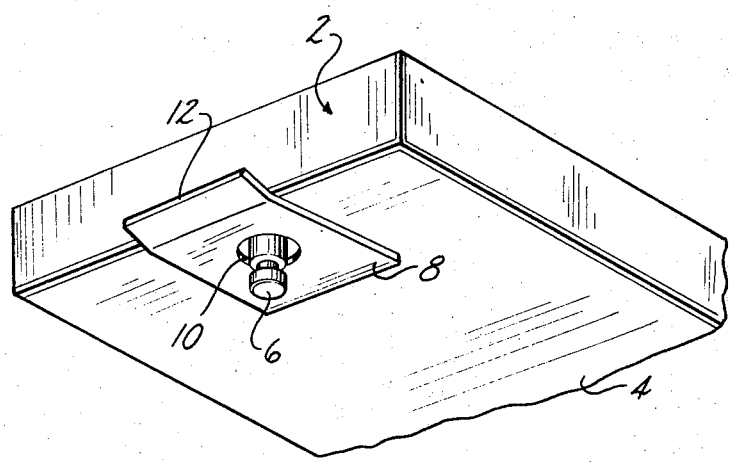
FIG. 1 is a three-dimensional view of the underside of a trailer, as seen from a position near the left front corner.

FIG. 1 shows the forward, underside of a trailer 2 having a floor 4 to which is secured mounting means for a king pin 6. In the embodiment here shown, a fifth wheel plate 8 is shown secured (as by welding) to floor 4 and provided with an opening 10 through which pin 6 projects for engagement with a conventional fifth wheel (not shown). Fifth wheel plate 8 is turned upward at its forward end as shown at 12 to facilitate the camming (lifting) action that takes place as the tractor fifth wheel is backed under the trailer.

Figure 3:
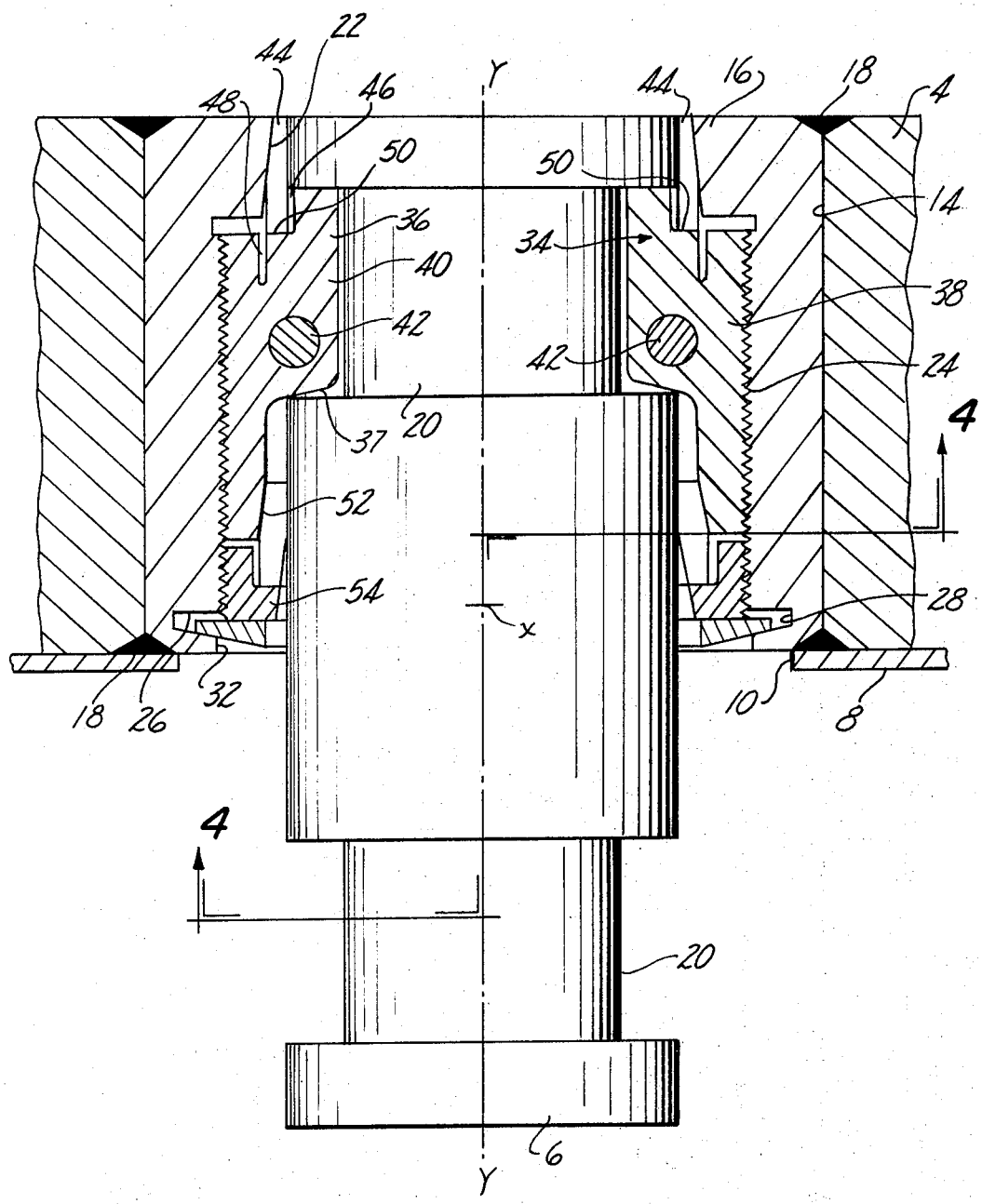
FIG. 3 is a section substantially on line 3—3 of FIG. 2. Note that line 3—3 is not coincident with the horizontal center line of the view.
Figure 4:
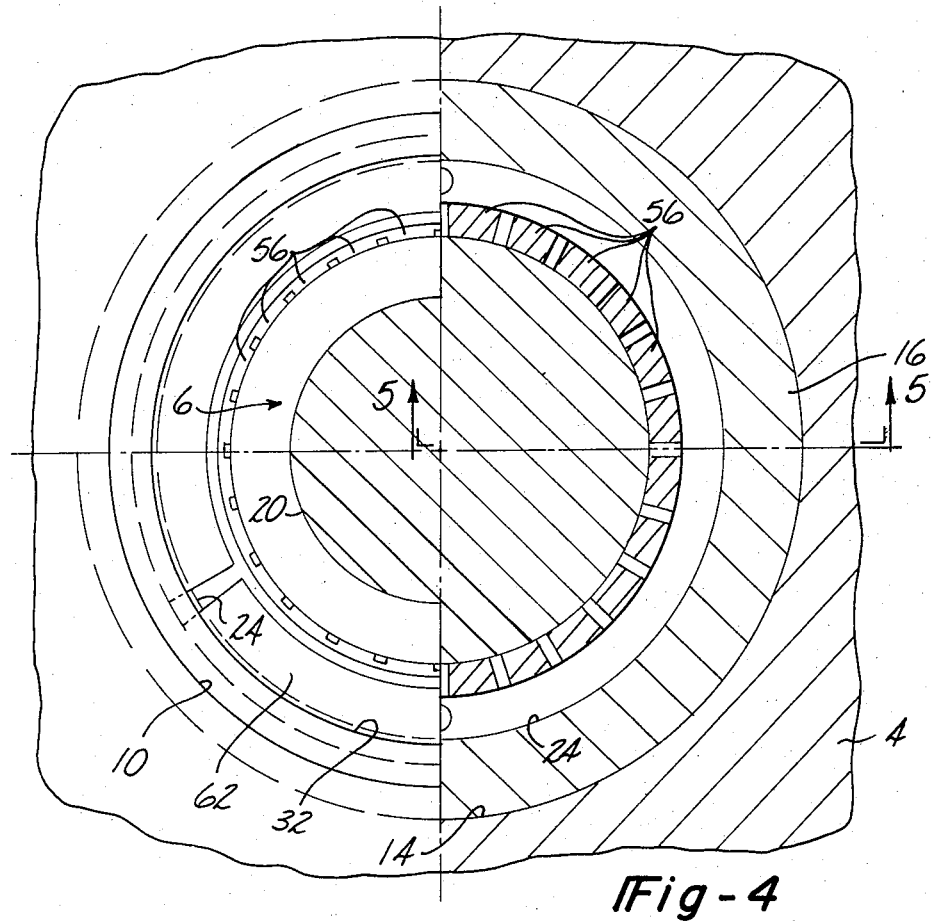
FIG. 4 is an off-set sectional view substantially on line 4—4 of FIG. 3.
Figure 5:
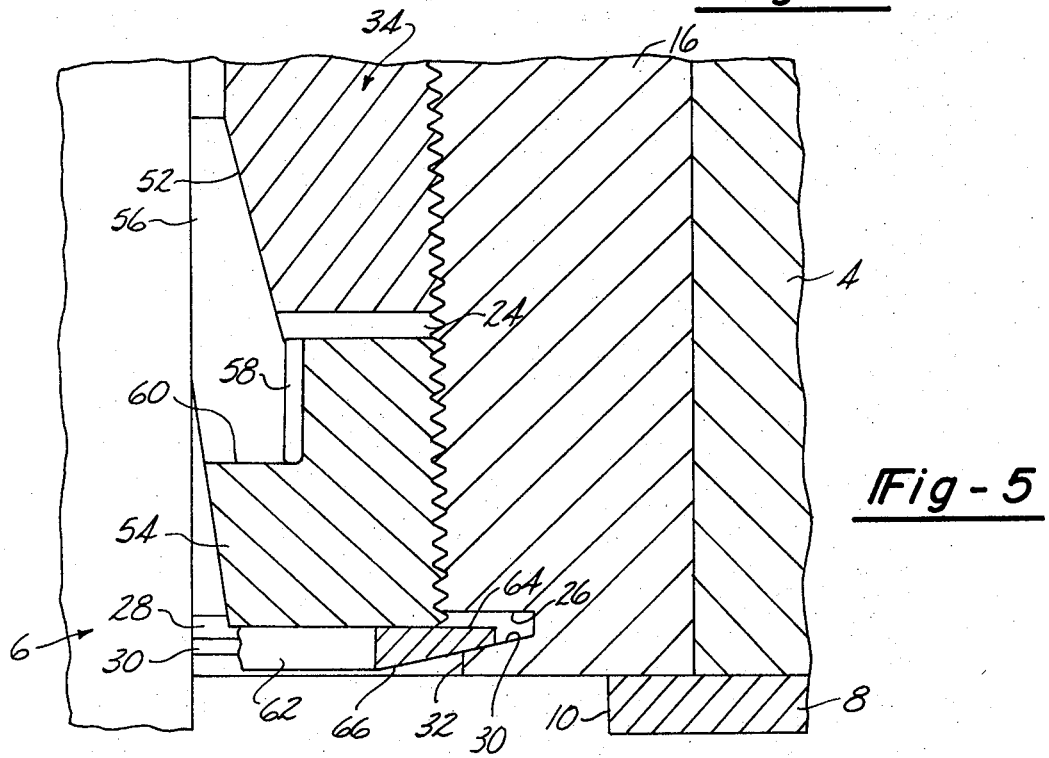
FIG. 5 is a larger scale view in section on line 5—5 of FIG. 4.

As is best shown in FIG. 3, floor 4 is provided with an opening 14 in which is secured a base 16 by such conventional means as will insure the structural integrity of the assembly. For example, a weldment 18 is shown in the upper surface of floor 4 securing base 16 in position in the opening 14; preferably, base 16 is flush with the upper surface of floor 4 so as to offer no obstacle to the movement of objects across the floor or to the storage of goods having planar surfaces on the floor above the king pin.

King pin 6 is shown in detail in FIG. 3 as a circular cylinder provided with two annular grooves 20 closely adjacent its two extremities. Because the trailer coupling under consideration must cooperate with a number of tractor fifth wheel designs, all of which are considered conventional, the portion of the king pin which projects below the fifth wheel plate 8 must be of a shape and size that will function with any and all of the conventional tractor fifth wheels. Because it is desirable that the king pin be reversible, pin 6 is symmetrical about midpoint X shown in FIG. 3.

Conventionally mounted king pins are firmly secured in their mounts, usually by means of welds. There must be no looseness of the pin in its mount because of the severe accelerations the parts undergo. Thus a readily removable pin presents a designer with several substantial problems due to conflicting requirements. Where two pieces of metal are joined in circumstances requiring easy separation, there may be difficulty eliminating all "play" in such an assembly. Conversely, such an assembly which is rigid enough to quarantee no relative movement of the several parts may actually be a hard one to disassemble.

Wedges have been developed as useful expedients, from primitive times to date, and lend themselves to situations requiring enormous force outputs from a mechanical system which can avail itself of only small force inputs. The invention here disclosed and claimed uses wedge means to reconcile the conflicting requirements of great strength and rigidity to hold an assembly together, as against the requirement that the assembly be easily and quickly dismantlable.

In the illustrated embodiment, base 16 is provided with an opening which is symmetrical about the axis Y—Y of king pin 6 (FIG. 3). In the radial or transverse direction (i.e., perpendicular to axis Y—Y), the opening in base 16 is larger than pin 6. Since pin 6 and the opening in base 16 are concentric, the internal surface of the opening and the external surface of the pin 6 define between them an annular space. At the upper end of the opening as seen in FIG. 3, the internal surface shown is a conical surface 22. Conical surfaces lend themselves readily to wedging functions and surface 22 serves such a purpose in the disclosed and claimed invention, as is detailed below.

Below the conical surface 22 and throughout the major portion of the vertical dimension of base 16, the opening in base 16 is threaded as shown at 24, to a plane 26 near the lower end of the opening, that plane being the upper boundary of a groove 28 which is bounded also by a conical surface 30. Below surface 30, the opening is larger than the threaded portion 24, as shown at 32, so that an externally threaded member can pass freely through opening 32 to engage thread 24.

The wedge means hereinabove referred to will now be detailed. The annular space bounded externally by the wall of the above-detailed opening in base 16, and bounded internally by the king pin, is occupied by the wedge means. At the upper end of the annular space there is disposed a wedge adapter indicated generally by reference character 34.

Figure 2:
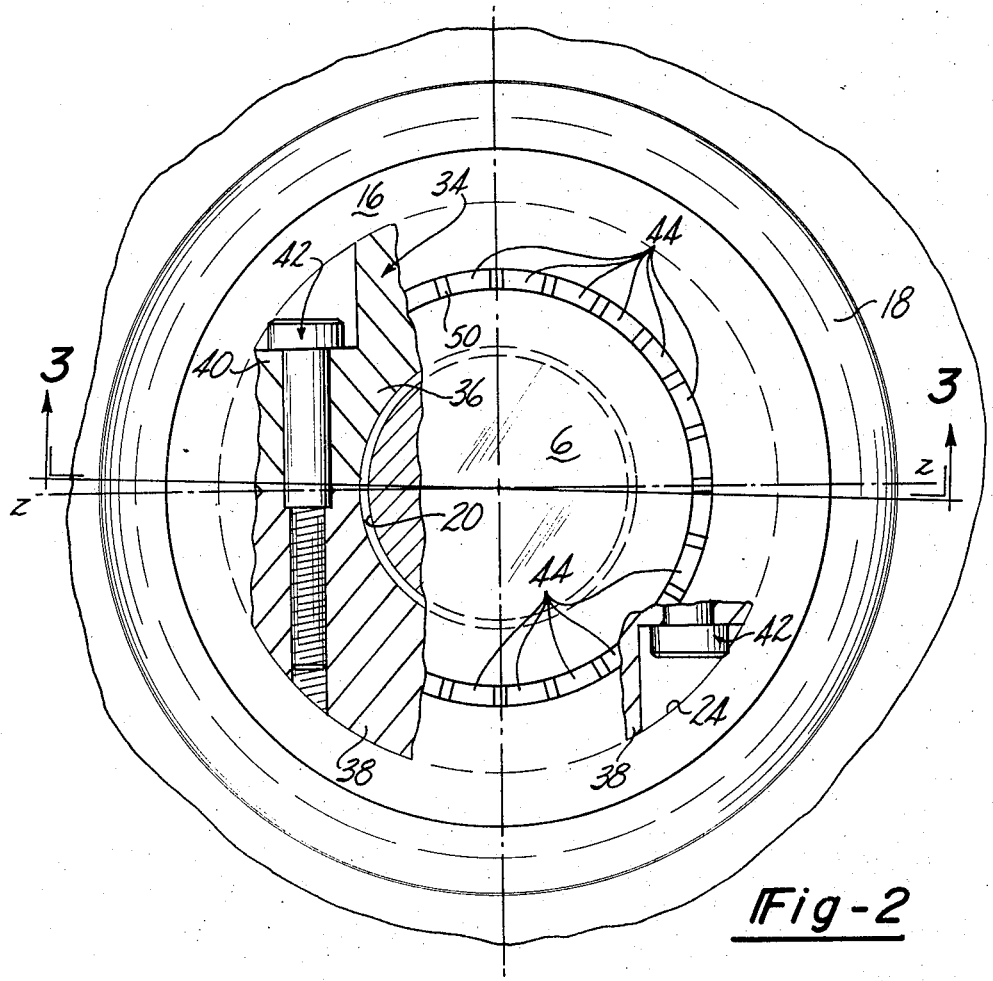
FIG. 2 is a top plan view, on a large scale, of the king pin mounting means, with parts broken away and in section.

In the illustrated embodiment, wherein a reversible king pin is shown in the mounting means, it is expedient to provide the wedge means, and specifically the wedge adapter, with radially-inward extending means 36, having an annular conical surface 37, to occupy groove 20 of the upper end of the king pin. Therefore, to facilitate assembly of pin 6 and wedge adapter 34, the latter is made in two pieces 38 and 40, shown in FIG. 2 as dividing along the horizontal center line Z—Z. The two pieces are held together by means of any suitable conventional device, here shown as two threaded members 42.

At its upper end, wedge adapter 34 is provided with a plurality of integral elongated elements 44 which may be formed initially from an annulus integral with the adapter by slotting the end of the annulus along spaced radial planes. In addition, the body of wedge adapter 34 is desirably grooved immediately radially inward and immediately radially outward of the annulus out of which elements 44 are cut, as shown at 46 and 48, respectively. Grooves 46 and 48 are formed, for example, by an annularly-shaped cutting tool moving parallel to axis Y—Y. The slots forming elements 44 extend axially to a plane substantially tangent to the bottom of groove 46, as shown at 50.

The outer surfaces of elements 44 form an external conical surface which is adapted to engage internal conical surface 22 in the wedging action that secures base 16 and pin 6 against relative movement, in which action the internal surfaces of elements 44 form an internal cylindrical surface adapted to engage the external cylindrical surface of king pin 6 at its extremity and axially outward of groove 20. Wedge adapter 34 is externally threaded to cooperate with internal thread 24 of base 16.

At its lower end as seen in FIG. 3, wedge adapter 34 is provided with an internal conical surface 52. The complete wedge means includes a lock ring 54 which carries a plurality of elements 56 adapted to engage adapter 34 and pin 6. Toward that end, the external surfaces of elements 56 are conical to cooperate with internal conical surface 52 and the internal surfaces of elements 56 are cylindrical to cooperate with pin 6 whereby to contact adapter 34 and pin 6 in tight frictional engagement and hold them against relative movement.

Lock ring 54 is also cylindrically grooved as shown at 58. As in the case of elements 44 described above, elements 56 may be formed by cutting radial slots in an annulus, the bottoms of the slots being substantially coterminous with the lower end of groove 58, as shown at 60. Lock ring 54 is externally threaded to cooperate with internal thread 24 in base 16.

Reference is made above to groove 28 in the opening in base 16. A snap ring 62 is disposed in groove 28, and is preferably provided with a plane surface 64 to engage the lower end of lock ring 54, and a conical surface 66 to engage conical surface 30 of groove 28.

The web surface of each groove 20 defines a circumferential bearing surface operable to absorb radial forces imposed on the kingpin by the non-illustrated coupling device. The two side surfaces of each groove 20 constitute radial bearing surfaces operable to absorb axial forces imposed on the kingpin. As best shown by FIG. 3, grooves 20 subdivide the kingpin surface into a central land area (forcibly engaged with elements 56) and two end land areas (one of which is shown forcibly engaged with elements 44). The defined land areas are widely spaced along the kingpin axis for best achievement of anti-wobble action in opposition to the radially imposed load forces.

Operation

Starting with a new king pin 6, the operator places the two halves 38 and 40 on the king pin with the projections 36 of the two halves in engagement with the same groove 20 and secures the two parts 38 and 40 together by means of screws 42. He then screws the thus assembled wedge adapter 34 into the thread 24 of base 16, turning adapter 34 in as far as possible and tightly engaging elements 44 with the conical surface 22 and with the flange which forms the upper end of the king pin.

He then turns lock ring 54 into thread 24, tightly engaging elements 56 with conical surface 52 and pin 6. Having pulled the assembly up tight, the operator engages the snap ring 62 in groove 28.

The king pin thus mounted is used until the lower end becomes so worn that a change is desirable. The operator takes the pin out of its mounting by reversing the process outlined above, and then reassembles the pin in its mounting with the ends reversed. The reversed pin is then run until worn, whereupon the pin is ready to be replaced and scrapped.

I wish it to be understood that I do not desire to be limited to the exact details of construction shown and described, for obvious modifications will occur to a person skilled in the art.

The invention described herein may be manufactured, used, and licensed by or for the Government for governmental purposes without payment to me of any royalty thereon.

I claim:

1. A tractor-trailer coupling comprising a king pin; king pin mounting means comprising a base having an opening to receive one end portion of the king pin, said opening being larger than the king pin and forming therewith an annular space, wedge means in said space adapted to make wedging contact between the wall of said opening and the king pin disposed in the opening, and still other wedge means in said space adapted to make wedging contact between the first-named wedge means and said king pin.

2. The coupling of claim 1, wherein said wall defines a conical surface.

3. The coupling of claim 2 wherein said base opening is provided with a screw thread, and both wedge means are threaded, whereby the wedge means have threaded engagement with the base in the opening.

4. The coupling of claim 3, wherein the king pin is conventionally provided with an annular groove, and the first-named wedge means is provided with radially-inward extending means to engage said groove.

5. The coupling of claim 4, wherein the first-named wedge means is provided with a plurality of elongated elements engageable with said conical surface to be deflected into locking engagement with the king pin.

6. The coupling of claim 5, wherein the first-named wedge means is provided with a conical surface, and a second-named wedge means is provided with a plurality of elements adapted to engage the conical surface of the first-named wedge means to be deflected into locking engagement with the king pin.

7. The coupling of claim 1 wherein said base opening is provided with a screw thread, and both wedge means are threaded, whereby the wedge means have threaded engagement with the base in the opening.

8. The coupling of claim 7, wherein the king pin is conventionally provided with an annular groove, and the first-named wedge means is provided with radially-inward extending means to engage said groove.

9. The coupling of claim 8, wherein the first-named wedge means is provided with a conical surface, and the second-named wedge means is provided with a plurality of elements adapted to engage the conical surface of the first-named wedge means to be deflected into locking engagement with the king pin.

10. The coupling of claim 1, wherein the king pin is conventionally provided with an annular groove, and the first-named wedge means is provided with radially-inward extending means to engage said groove.

11. The coupling of claim 10, wherein the first-named wedge means is provided with a conical surface, and the second-named wedge means is provided with a plurality of elements adapted to engage the conical surface of the first-named means.

12. A tractor-trailer coupling comprising a base; a reversible kingpin adapted to have either end thereof insertable into said base, leaving the other end thereof exposed for coupling purposes; said kingpin having two similarly configured peripheral grooves spaced equal distances from respective ones of its ends so that the kingpin is symmetrical about a transverse axis midway between its ends; each defining a circumferential bearing surface and two radial bearing surfaces operable for coupling purposes; said grooves subdividing the kingpin into a central land area and two end land areas; and means for releasably locking the kingpin in the base, including radially acting support surfaces engaging the central land area and a selected one of the end land areas, to preclude wobble of the kingpin in the base.

13. The coupling of claim 12 wherein the releasable locking means includes ledge means locatable in the selected groove to engage the superjacent radial bearing surface for absorbing axial loads imposed on the kingpin.

14. The coupling of claim 12 wherein the releasable locking means comprises a first wedge means acting radially on the selected land area, and a second wedge means acting radially on the central land area.

15. A tractor-trailer coupling comprising a base; a kingpin insertable into said base, leaving an end thereof exposed for coupling purposes; and means for releasably locking the kingpin in the base, including separate radially acting wedge elements forcibly interposed between the base and the kingpin at widely spaced points along the kingpin axis.

16. The coupling of claim 15 wherein the kingpin comprises an outwardly radiating flange locatable within the base, and the locking means includes a support ring structure insertable into the base to underlie said flange and thereby absorb axial loads imposed on the kingpin.

17. The coupling of claim 15 wherein the kingpin comprises an outwardly radiating flange locatable within the base; said locking means comprising an externally threaded ring structure screwable into the base; said ring structure being adapted to underly said flange to absorb axial loads imposed on the kingpin; said ring structure being provided with wedge element fingers locatable between the base and the peripheral edge of said flange for exerting radial forces thereon in opposition to radial loads imposed on the kingpin.

18. The coupling of claim 15 wherein the separate radially acting wedge elements are individually carried by separate threaded members adapted to be separately screwed into the base.

* * * * *